US007375173B2

(12) United States Patent
Steiner et al.

(10) Patent No.: US 7,375,173 B2
(45) Date of Patent: May 20, 2008

(54) ECOFRIENDLY CATIONIC POLYELECTROLYTES

(75) Inventors: Norbert Steiner, Alzenau (DE); Gregor Herth, Krefeld (DE); Werner Fischer, Willich (DE); Horst Redlof, Willich (DE)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 347 days.

(21) Appl. No.: 10/518,595

(22) PCT Filed: Jul. 30, 2003

(86) PCT No.: PCT/EP03/08428

§ 371 (c)(1),
(2), (4) Date: Dec. 21, 2004

(87) PCT Pub. No.: WO2004/020490

PCT Pub. Date: Mar. 11, 2004

(65) Prior Publication Data

US 2005/0242045 A1 Nov. 3, 2005

(30) Foreign Application Priority Data

Aug. 30, 2002 (DE) ............... 102 40 797

(51) Int. Cl.
*C08F 18/22* (2006.01)
*C08F 20/60* (2006.01)

(52) U.S. Cl. .................. 526/292.2; 526/292.1; 526/292.6; 526/307.2; 526/307.3; 526/307.7; 526/312; 524/829; 524/831; 524/833; 210/609; 210/734; 210/735

(58) Field of Classification Search ............ 526/292.1, 526/292.4, 292.6, 307.2, 307.3, 307.7, 312, 526/292.2; 524/829, 831, 833; 210/609, 210/734, 735
See application file for complete search history.

(56) References Cited

U.S. PATENT DOCUMENTS

| 2,831,841 | A |   | 4/1958  | Jones et al. |
| 3,929,739 | A |   | 12/1975 | Barabas et al. |
| 5,587,415 | A | * | 12/1996 | Takeda ............ 524/458 |
| 5,776,362 | A | * | 7/1998  | Sato et al. ......... 252/194 |

FOREIGN PATENT DOCUMENTS

| DE | 25 08 346 A1 | 8/1975 |
| DE | 28 23 830 A1 | 1/1979 |
| DE | 30 46 978 A1 | 9/1981 |
| DE | 37 27 229 A1 | 3/1988 |
| DE | 38 00 199 A1 | 7/1989 |
| DE | 40 24 207 A1 | 2/1992 |
| DE | 41 38 763 A1 | 5/1993 |
| DE | 197 04 953 A1 | 8/1998 |
| DE | 197 48 153 A1 | 5/1999 |
| DE | 197 52 127 A1 | 7/1999 |
| DE | 197 52 128 A1 | 7/1999 |
| DE | 100 41 392 A1 | 3/2002 |
| DE | 100 41 393 A1 | 3/2002 |
| EP | 0 165 770 | 12/1985 |
| EP | 0 649 820 | 4/1995 |
| FR | 2 390 983 | 12/1978 |
| JP | 10-309405 | * 11/1998 |
| WO | WO 02/06097 A1 | 1/2002 |

OTHER PUBLICATIONS

Ernst Bartholomé, et al., "Ullmanns Encyklopädie der technischen Chemie", Verlag Chemie, pp. 15-16.
Heinz Horacek, "Fette und Öle Fettderivate Folgeprodukte", Fett-, Öl-, Tensid-, Kosmetik- und Pharmaindustrie, Jul. 1988, vol. 114, 11/12, pp. 447-455.
H. Takigami, et al., "Toxicity assays and their evaluation on organic polymer flocculants used for municipal sludge dewatering", Water Science and Technology, 1998, vol. 38, No. 7, 1 Page.
V. N. Syuckin, et al., "New ecologically safe "flocculants"—cationic polyelectrolytes", Khimiya Rasticelougo Syrya, 136:218483, 2000, vol. (2), 4 Pages.
Kumio Fujiwara, et al., "Synthetic organic "polymer" "flocculants" and monomer removal from the "flocculants" for water treatment", Jpn. Kokai Tokyo Koho, 133:22112, 1 Page, Jun. 2000.
M. Albasiaid, et al., "Ultrastructural and clinionpathological studies on the "toxicity" of cationic "acrylamide" based flocculant to rainbow trout", Veterinary Pathology, 106:133214, 1987, vol. 24 (1), 1 Page.
Yu L. Veitser, et al., ""Polymer" for "flocculation" of wastewater sediments", U.S.S.R., Orkrytiya, Izabret, 105:7067, vol. (47), 1 Page, Dec. 1985.
Toru Kuboi, et al., ""Toxicity" of cationic "polymer" "flocculants" to higher plants, I. Seedling assay", Soil Science and Plant Nutrition (Tokyo, Japan), 101:224294, 1984, vol. 30 (3), 1 Page.
D. Mourato, et al., "Effect of polyelectrolytes used as "flocculants" on microorganisms present in receiving streams", Sciences et Techniques de l'Eau, 100:108802, 1983, vol. 16 (4), 1 Page.
Toru Kuboi, et al., "Effect of synthetic "flocculants" on soil environment. I. Effect of polyacrylamide derivatives (synthetic "flocculants") on growth of turnip seedlings and of green alga", Kokuritsu Kogai Kenkyusho Kenkyu Hokoku, 94:151324, 1980, vol. 14, 1 Page.
S. Novakova, et al., "Study of the "toxic" action of new "flocculants" obtained under new pilot-plant conditions", Khigiena j Zdraveopazvane, 86:166013, 1976, vol. 19 (5), 1 Page.
G. Paulet, et al., ""Toxicity" of some acrylic and methacrylic esters of "acrylanxide" and polyacrylamides", Archives des Maladies Profersionnelles de Medecine du Travail et de Securite Sociale, 83:91832, 1975, vol. 36 (1-2), 1 Page.
D. D. McCollister, et al., ""Toxicologic" investigations of polyacrylamides", Toxicol. Appl. Pharmacol., 63:92536, 1965, vol. 7 (5), 2 Pages.

* cited by examiner

Primary Examiner—Helen L Pezzuto
(74) Attorney, Agent, or Firm—Oblon, Spivak, McClelland, Maier & Neustadt, P.C.

(57) ABSTRACT

The invention relates to cationic water-soluble polyelectrolytes, especially terpolymers, which are obtained by polymerising monomers of (meth)acrylamide, a quaternised (meth)acrylamide derivative, a (meth)acrylic acid derivative and/or hydrolysis-stable cationic monomers. The composition of the polyelectrolytes is characterised by a toxicity index formula $F_i = (QTP - 2QME)/10 \leq 1$ wherein QTP represents the total cationic charge of the polymer and QME represents the charge part of the ester type monomer. The invention also relates to the production and use of said polyelectrolytes and water-in-water polymer dispersions which contain said polyelectrolytes.

13 Claims, No Drawings

ECOFRIENDLY CATIONIC POLYELECTROLYTES

The present invention relates to cationic water-soluble polyelectrolytes, especially terpolymers of (meth)acrylamide, monomers based on cationic (meth)acrylic acid esters and monomers based on (meth)acrylamides and/or hydrolysis-stable cationic monomers, to the synthesis and use of same and to water-in-water polymer dispersions containing such polyelectrolytes.

Polymers of nonionogenic, anionic and cationic vinyl polymers are used as flocculating agents in wastewater treatment, in ore and coal processing and in paper manufacture. Of particular importance in this regard are water-soluble cationic polyelectrolytes, which are used in large quantities worldwide in water treatment facilities, especially to improve flocculation and dewatering of the resulting sewage sludges. As a rule, these are polymers of cationized acrylic acid derivatives or methacrylic acid esters or are copolymers of these esters from acrylamide.

For example, German Patent 3544909 describes copolymers of dimethylaminopropylacrylamide (DIMAPA) and acrylamide (AA), in which the DIMAPA is either neutralized with mineral acids or is quaternized with quaternizing agents, and which have a proportion of between 4 and 80 mol % of cationic monomers as well as a ratio of viscosity to molar content of cationic components exceeding 200. Such copolymers are characterized by very good storage and hydrolysis stability, thus making them advantageous for sludge dewatering.

DE 19941072 describes a method for continuous synthesis of at least one monomer, wherein at least one parameter influencing the polymerization is varied according to a repeating pattern. According to this described method, copolymers among other substances and also terpolymers are obtainable by polymerization of (meth)acrylamide monomers as well as monomers based on (meth)acrylic acid esters and (meth)acrylamides.

European Patent 0649820 describes terpolymers of acrylamide, acrylic acid and cationic monomers in combination with alkaline earth salts and the use of same in sludge dewatering. The sludge-dewatering agents synthesized therefrom have improved solubility and storage stability.

In U.S. Pat. No. 4,889,887 there are described terpolymers of (meth)acrylamide, monomers based on (meth)acrylic acid esters and monomers based on (meth)acrylamides. These terpolymers are used as constituents of acid thickening agents, and their use in production of petroleum and natural gas is described. Terpolymers are reacted with HCl in order to cross-link them.

As can be inferred from the already cited German Patent 3544909, the polymers based on cationized (meth)acrylic acid esters and commonly used for flocculation suffer from several disadvantages.

In particular, the storage stability of such polymers is very limited, because aqueous solutions containing these polymers diluted to 0.1 to 0.3% must be prepared for use as flocculating agents. Because the ester groups in the polymers are susceptible to hydrolysis, such solutions are not very stable during storage. For example, it is reported in the document that the stability time of acrylic derivatives in solvent waters having pH values of 7.0 to 7.5 is only a few hours, while that of methacrylic derivatives is about 24 hours.

A known method of maintaining the practical properties and storage stability in view of this instability to hydrolysis is to add an organic or inorganic acid to products containing such copolymers. As examples, dimethylammoniummethyl (meth)acrylate (ADAME-Quat) quaternized with methyl chloride can be cited here, as can other ester-based cationic monomers. Despite this measure, the activity of solutions of such polymers decreases very rapidly. The half life is only two to three days. This means that users who have to interrupt dispensing such products for relatively long times, such as over the weekend, will have problems in further processing the prepared solution at a later time, especially in chamber filter presses.

A further disadvantage of such cationic polyelectrolytes is that they have high acute aquatic toxicity, depending on charge density. At a charge of about 15 wt % and greater, the fish toxicity of such polymers is <10 mg/l (OECD 203). For example, at cationic activity of 20 wt % and greater, quaternized copolymers based on (meth)acrylamide have such high aquatic toxicity that such products must be classified as hazardous to the environment. However, Chang et al. were able to show that polymers based on quaternized (meth)acrylic acid esters are converted by hydrolysis to the corresponding anionic polymers, which have much lower toxicity (see Chang et al., "Water Science Technology", Vol. 44, No. 2-3, 461-468, 2001).

The object of the present invention was therefore to provide ecofriendlier polymers, which can be used for dewatering of sewage sludges, for conditioning of potable water or for manufacture of paper, which dissolve rapidly and completely in aqueous media, which have high efficacy of application as well as good storage stability, which do not exhibit the disadvantages of rapid loss of efficacy and which can be degraded completely within a few days to low-toxicity products.

It has been surprisingly found that this object can be achieved by cationic water-soluble polyelectrolytes, especially terpolymers, which are obtainable by polymerization of monomers of (meth)acrylamide, a quaternized (meth) acrylamide derivative and a (meth)acrylic acid derivative and or hydrolysis-stable cationic monomers, the composition of the polyelectrolyte being characterized by a toxicity index $$F_i = (Q_{TP} - 2Q_{ME})/10 \leq 1$$

where
  $Q_{TP}$=total cationic charge of the polymer
  $Q_{ME}$=charge proportion of the ester-type monomer.

By $Q_{TP}$=total cationic charge of the polymer, there is understood within the meaning of the present invention the proportion in mol % of all cationic monomers in the polymer.

By $Q_{ME}$=charge proportion of the ester-type monomer, there is understood within the meaning of the present invention the proportion in mol % of the ester-type monomer in the polymer.

The inventive polyelectrolytes have a total charge of 1 to 100 mol %, preferably 8 to 90 and particularly preferably 20 to 80 mol %, and their solution viscosity, measured as 1% solution in 10% NaCl solution, is 10 to 2000 mPas, preferably 80 to 1500 mPas and particularly preferably 100 to 1200 mPas.

Particularly preferred are polyelectrolytes that contain 0.1 to 30 wt %, preferably 3 to 25 wt % and particularly preferably 7 to 20 wt % of a highly cationic, low molecular weight polyelectrolyte.

According to the invention, there are preferably used, as cationic monomers based on (meth)acrylic acid esters, cationized esters of the (meth)acrylic acid containing a quaternized N atom. Preferably there are used quaternized dialkylaminoalkyl (meth)acrylates with $C_1$ to $C_3$ in the alkyl and alkylene groups, especially ammonium salts of dimethylaminomethyl (meth)acrylate, dimethylaminoethyl (meth)acrylate, dimethylaminopropyl (meth)acrylate, diethylaminomethyl (meth)acrylate, diethylaminoethyl (meth)acrylate and diethylaminopropyl (meth)acrylate quaternized with methyl chloride. Particularly preferred is dimethylaminoethyl acrylate, which is quaternized with an alkyl halide, especially with methyl chloride or benzyl chloride or dimethyl sulfate (ADAME-Quat).

As cationic monomers there are used monomers based on (meth)acrylamides that contain a quaternized N atom. Preferably there are used quaternized dialkylaminoalkyl(meth)acrylamides with $C_1$ to $C_3$ in the alkyl and alkylene groups. Particularly preferred is dimethylaminopropylacrylamide, which is quaternized with an alkyl halide, especially methyl chloride or benzyl chloride or dimethyl sulfate.

Hydrolysis-stable cationic monomers can be, in addition to the dialkylaminoalkyl(meth)acrylamides described in the foregoing, all monomers that can be regarded as stable to the OECD hydrolysis test. Examples are diallyldimethylammonium chloride or water-soluble, cationic styrene derivatives.

Particularly preferred as cationic polyelectrolytes according to the invention are terpolymers of acrylamide, 2-dimethylammoniummethyl (meth)acrylate quaternized with methyl chloride (ADAME-Q) and 3-dimethylammoniumpropyl(meth)acrylamide quaternized with methyl chloride (DIMAPA-Q).

The inventive polyelectrolytes can be synthesized by known methods, such as emulsion, solution, gel and suspension polymerization, preferably gel and solution polymerization. It is essential to the invention, however, that the composition of the polyelectrolytes be characterized by the aforesaid toxicity index $$F_i = (Q_{TP} - 2Q_{ME})/10 \leq 1$$

where $Q_{TP}$=total cationic charge of the polymer $Q_{ME}$=charge proportion of the ester-type monomer.

Preferably such polyelectrolytes are synthesized by mixing the combination of the cationic monomers based on (meth)acrylic acid esters and monomers based on (meth)acrylamides and (meth)acrylamide and/or hydrolysis-stable cationic monomers and initiating the polymerization. During the polymerization a solid gel is formed from the monomer solution, and is subsequently crushed, dried and ground.

Preferably the inventive polyelectrolytes are polymerized from the aforesaid monomers in aqueous solution. The solution then obtained can be used directly for synthesis of the inventive products.

The polymerization is preferably carried out as an adiabatic polymerization, and it can be initiated either with a redox system or with a photoinitiator. Moreover, a combination of both initiation methods is possible. The redox initiator system is composed of at least two components—an organic or inorganic oxidizing agent and an organic or inorganic reducing agent. In many cases, compounds containing peroxide units are used for this purpose. Examples are inorganic peroxides such as alkali metal and ammonium persulfate, alkali metal and ammonium perphosphates, hydrogen peroxide and its salts, especially sodium peroxide and barium peroxide, or organic peroxides such as benzoyl peroxide and butyl hydroperoxide, or per acids such as peracetic acid. In addition, however, other oxidizing agents can also be used, such as potassium permanganate, sodium and potassium chlorate, potassium dichromate, etc. As reducing agents there can be used sulfur-containing compounds such as sulfites, thiosulfates, sulfinic acid and organic thiols such as ethylmercaptan and 2-hydroxyethanethiol, 2-mercaptoethylammonium chloride, thioglycolic acids and others. In addition, there can also be used ascorbic acid and low-valency metal salts, preferably copper (I), manganese (II) and iron(II) salts. Phosphorus compounds can also be used, such as sodium hypophosphite. In the case of photopolymerization, the reaction is initiated with UV light, which causes decomposition of the initiator. As initiators there can be used benzoin and benzoin derivatives, such as benzoin ether, benzil and its derivatives, such as benzil ketals, acryldiazonium salts, azo initiators such as 2,2'-azobis(isobutyronitrile) and 2,2'-azobis(2-amidinopropane) hydrochloride or acetophenone derivatives. The quantity of the oxidizing and reducing components can range from 0.00005 to 0.5 weight per cent, preferably from 0.001 to 0.1 weight percent relative to the monomer solution. For photoinitiators it can range from 0.001 to 0.1 weight percent, preferably 0.002 to 0.05 weight per cent.

The polymerization is carried out batchwise in aqueous solution in a polymerization vessel or continuously on an endless belt, as described, for example, in German Patent 3544770. This step is introduced herewith as the reference step, and is incorporated as part of the disclosure. The process is initiated at a temperature of between −20 and 50° C., preferably between −10 and 10° C., and is carried out at atmospheric pressure without external heat supply. Because of the heat of polymerization, a maximum final temperature of 50 to 150° C. is reached, depending on the content of polymerizable substance.

On completion of polymerization, the polymerized product obtained in the form of a gel is crushed.

The crushed gel is now dried batchwise in a circulating-air drying oven at 70 to 150° C., preferably at 80 to 130° C. Drying can be achieved continuously in the same temperature ranges on a belt dryer or in a fluidized-bed dryer.

After drying, the product is ground to the desired particle-size fraction.

The water-soluble terpolymers of acrylamide, 2-dimethylammoniummethyl (meth)acrylate, quaternized with methyl chloride (ADAME-Q) and 3-dimethylammoniumpropyl (meth)acrylamide, quaternized with methyl chloride (DI-MAPA-Q)—which are particularly preferred according to the invention—dissolve very rapidly without residues.

An additional advantage is that, as will be proved hereinafter by means of practical tests, solutions of these products still exhibit high activity even after 72 hours. In comparison, cationic polymers, especially copolymers based on quaternized methacrylic acid esters, especially of the ADAME-Quat type, undergo a considerable loss of efficacy after 72 hours. In addition, such polymer solutions of the ADAME-Quat type already exhibit considerable turbidity after 24 hours.

In addition, it was found completely surprisingly that, by the inventive combination of a quaternized (meth)acrylamide derivative and a (meth)acrylic acid derivative as the cationic monomers, there can be obtained polymers that already lose their toxicity after a short time in solution due to hydrolysis and charge neutralization.

For example, it has been shown that the fish toxicity of the water-soluble polyelectrolytes in solution decreases drastically after 72 hours, from 6.2 mg/l to >100 mg/l, even though the practical properties change only slightly. This is especially true of terpolymers that are obtainable by polymerization of the monomers (meth)acrylamide, quaternized (meth)acrylamide derivative and a (meth)acrylic acid derivative and/or hydrolysis-stable cationic monomers, wherein the composition of the polyelectrolytes is characterized by the aforesaid toxicity index $F_i$. It has also been found that only terpolymers whose composition corresponds to the above equation for the toxicity index $F_i$ have such properties.

Furthermore, the inventive polyelectrolytes have much better dewatering capacity than do corresponding prior art products. As will be shown experimentally hereinafter, a terpolymer synthesized according to European Patent 0649820 by analogy with Example 3, using 22.5 mol % of cationic monomer (DIMAPA-Q), 22.5 mol % of acrylic acid and 55 mo % of acrylamide, exhibited much poorer dewatering capacity in the sludge-dewatering tests. For example, despite a 25% higher dosage of the 0.1% solution, the dewatering capacity after a standing time of 1 hour was much lower than that of an inventive cationic terpolymer. Even after the solution was left to stand for 3 days, the dewatering capacity of the inventive terpolymer was greater than that of the corresponding ADAME-acrylamide copolymer and of the amphoteric polymer according to European Patent 0649820.

The dissolution time for preparation of a 0.1% solution of the amphoteric polymer by analogy with European Patent 0649820 was about 2 hours. A residue of about 20 g was found. The fish toxicity (OECD 203) of the product exceeded 100 mg/l.

By virtue of these advantageous properties, the inventive polyelectrolytes can be used particularly preferably for dewatering of sewage sludges, for purification of waste water, for conditioning of potable water or for manufacture of paper or cardboard. Furthermore, such polyelectrolytes can also be used in water-in-water polymer dispersions, which are also subject matter of the present invention.

The invention will be explained hereinafter by means of examples. These explanations are provided merely by way of example and do not limit the general inventive idea.

EXAMPLES

Determination of the Solution Viscosity of the Polymer

The viscosities were determined with a Brookfield viscometer on a 1.0% solution in 10% NaCl solution. The dissolution time in these experiments was one hour.

Determination of the Gel Content of the Polymer

To determine the insoluble fraction, 1 liter of a 0.1% solution was prepared in conductivity water and stirred for 60 minutes at 300 rpm. This solution was then filtered through a 0.315 mm sieve, and 5 liters of water was used for rinsing. The supernatant was transferred into a measuring cylinder and the volume determined.

The following abbreviations are used:
ABAH: 2,2'-azobis(2-amidinopropane)hydrochloride
DIMAPA-Quat: 3-dimethylammoniumpropyl(meth)acrylamide quaternized with methyl chloride
ADAME-Quat: 2-dimethylammoniummethyl(meth)acrylate quaternized with methyl chloride
Versenex 80 The Dow Chem. Corp.

Practical Methods

Determination of the Dewatering Effect by the Screen-Test Method

This test method was adapted to the dewatering method used in industry, namely continuous pressure filtration by means of filter presses or centrifugal dewatering in centrifuges.

With this method, organic cationic polymers are normally tested for their suitability as regards conditioning and dewatering of communal or industrial sludges.

The sludge is conditioned using the solution of flocculating agent to be tested under constant conditions (depending on the available dewatering unit). After conditioning, the sludge sample is filtered (=dewatered) on a metal screen (200 μm mesh openings). The dewatering time ($t_E$) for a given filtrate volume is measured and the clarity of the draining filtrate is evaluated (visually) in a clarity wedge.

| Clarity: | "0" = | no clarification |
| Clarity: | "46" = | best clarification |

Determination of Ionogenicity and Charge Density of Polymeric Flocculating Agents with the PCD Instrument of the Mütek Co.

In the investigation of developmental products, for example, precise knowledge of the existing charge density/ionogenicity (cationic, anionic, nonionogenic) of a synthetic flocculating agent is also needed.

The PCD instrument (type: 03 pH) of the Mütek Co. (D-82211 Herrsching) can be used for both qualitative and quantitative determination.

During the polyelectrolyte titration, the counterions are compensated for by oppositely charged polyions until the polymer chains no longer outwardly exhibit any charges. This neutral point corresponds to the isoelectric point or turning point of the titration.

From the polyelectrolyte demand necessary for this neutralization, together with appropriate knowledge of the underlying polymer basis of the product, it is then possible to calculate the ionogenicity.

Inventive Polymers:

The inventive polymers can be synthesized by standard polymerization methods. Preferably they are synthesized by gel polymerization. An example of this polymerization is presented in Example 1:

EXAMPLE 1

Polymer 1

In a polymerization vessel there was first placed 240.0 g of 50% aqueous acrylamide solution, into which there was mixed 406.0 g of water as well as 0.15 g of Versenex 80. After addition of 350.0 g of 80% ADAME-Quat solution, the pH was adjusted to 5.0 with 2.8 g of 50% sulfuric acid, and the mixture was cooled to −0° C. and blown out with nitrogen. After addition of 0.40 g of ABAH (2,2'-azobis(2-methylpropionamidine) dihydrochloride), the polymerization was initiated with UV light. Within 25 minutes, the polymerization temperature rose from −5° C. to 80° C. The polymer was crushed with a meat grinder and dried at 100° C. for 90 minutes. The product was ground to a particle-size fraction of 90 to 1400 μm.

EXAMPLE 2

Polymers 2 to 4 and 6—Terpolymers Containing ADAME-Quat and DIMAPA-Quat

The synthesis was performed once again as described in Example 1, except that the cationic monomers and water volumes were changed as described in the table.

| Polymer | Cationic monomers in wt % | Starting weight of Adame-Q | Starting weight of DIMAPA-Q | Starting weight of water |
|---|---|---|---|---|
| 2 | ADAME-Q/ DIMAPA-Q 52.5:17.5 | 262.5 g | 116.9 g | 302.0 g |
| 3 | ADAME-Q/ DIMAPA-Q 35:35 | 175.0 g | 233.3 g | 347.0 g |
| Comparison polymer | | | | |
| 4 | ADAME-Q/ DIMAPA-Q 17.5:52.4 | 87.5 g | 349.5 g | 327.0 g |
| 6 | ADAME-Q/ DIMAPA-Q 7:63 | 35 g | 420 g | 305.0 g |

EXAMPLE 3

Polymer 5—By Analogy with European Patent 0649820

In a polymerization vessel there was first placed 240 g of 50% aqueous acrylamide solution, into which there was mixed 429.0 g of water as well as 0.15 g of Versenex 80. After addition of 233.3 g of 60% DIMAPA-Quat solution and 52.0 g of acrylic acid, the pH was adjusted to 5.0 with 45 g of 50% sodium hydroxide solution, and the mixture was cooled to −0° C. and blown out with nitrogen. After addition of 0.40 g of ABAH (2,2'-azobis(2-methylpropionamidine) dihydrochloride), the polymerization was initiated with UV light. Within 25 minutes, the polymerization temperature rose from −5° C. to 80° C. The polymer was crushed with a meat grinder and dried at 100° C. for 90 minutes. The product was ground to a particle-size fraction of 90 to 1400 μm.

EXAMPLE 4

Polymer 7—Amphoteric Terpolymer with Sodium Acrylate/ DIMAPA-Quat

In a polymerization vessel there was first placed 160.0 g of 50% aqueous acrylamide solution, into which there was mixed 360.0 g of water as well as 0.15 g of Versenex 80. After addition of 400.0 g of 60% DIMAPA-Quat solution and 80.0 g of acrylic acid, the pH was adjusted to 5.0 with 59 g of 50% sodium hydroxide solution, and the mixture was cooled to −0° C. and blown out with nitrogen. After addition of 0.40 g of ABAH (2,2'-azobis(2-methylpropionamidine) dihydrochloride), the polymerization was initiated with UV light. Within 25 minutes, the polymerization temperature rose from −5° C. to 80° C. The polymer was crushed with a meat grinder and dried at 100° C. for 90 minutes. The product was ground to a particle-size fraction of 90 to 1400 μm.

EXAMPLE 5

Polymer 8—Amphoteric Terpolymer with Sodium Acrylate/ ADAME-Quat

The synthesis was carried out as in Example 4, except that 300 g of ADAME-Quat (80% solution) and 390.0 g of water were used instead of DIMAPA-Quat.

EXAMPLE

Polymer 9

The polymerization was carried out as in Example 1, except that 275.0 g of ADAME-Quat, 360.0 g of acrylamide and 365.0 g of water were weighed in.

EXAMPLE 7

Polymer 10

In a polymerization vessel there was first placed 334.4 g of 50% aqueous acrylamide solution, into which there was mixed 296.5 g of water as well as 210 mg of Versenex 80. After addition of 354.6 g of 60% DIMAPA-Quat solution, the pH was adjusted to 5.0 with 8.0 g of 50% sulfuric acid and 0.30 g of formic acid, and the mixture was cooled to −5° C. and blown out with nitrogen. After addition of 0.40 g of ABAH (2,2'-azobis(2-methylpropionamidine) dihydrochloride), the polymerization was initiated with UV light. Within 25 minutes, the polymerization temperature rose from −5° C. to 80° C. The polymer was crushed with a meat grinder and dried at 100° C. for 90 minutes. The product was ground to a particle-size fraction of 90 to 1400 μm.

EXAMPLE 8

Polymer 11

The polymerization was carried out as in Example 7, except that 240 g of acrylamide solution, 285.3 g of water and 466.7 g of DIMAPA-Quat were used. In addition, the polymerization was initiated at 7.5° C.

EXAMPLE 9

Polymer 12

The polymerization was carried out as in Example 8, except that it was initiated at 0° C. in order to obtain a higher viscosity.

EXAMPLE 10

Polymers 13 and 14

The synthesis was again carried out as described in Example 1, except that the cationic monomers and water volumes were changed as described in the table.

| Polymer | Cationic monomers in wt % | Starting weight of Adame-Q | Starting weight of DIMAPA-Q | Starting weight of water |
|---|---|---|---|---|
| 13 | ADAME-Q/ DIMAPA-Q 30/30 | 133.0 g | 177.3 g | 355.3 g |
| 14 | ADAME-Q/ DIMAPA-Q 15/45 | 66.5 g | 266.0 g | 333.1 g |

EXAMPLE 11

Polymer 15

The synthesis was again carried out as described in Example 6, except that it was initiated at 5° C.

Properties of the Polymers

| Polymer | Viscosity | Gel content |
|---|---|---|
| 1 | 550 mPas | 5 mL |
| 2 | 530 mPas | 10 mL |
| 3 | 570 mPas | 12 mL |
| 4 | 520 mPas | 15 mL |
| 5 | 320 mPas | 15 mL |
| 6 | 570 mPas | 20 mL |
| 7 | 520 mPas | 25 mL |
| 8 | 800 mPas | 5 mL |
| 9 | 570 mPas | 35 mL |
| 10 | 475 mPas | 15 mL |
| 11 | 200 mPas | 10 mL |
| 12 | 460 mPas | 12 mL |
| 13 | 580 mPas | 5 mL |
| 14 | 530 mPas | 10 mL |
| 15 | 500 mPas | 8 mL |

EXAMPLE 12

Polymers for Dewatering a Suspension of Fibrous Material

Polymer 16

In a polymerization vessel there was first placed 416.0 g of 50% aqueous acrylamide solution, into which there was mixed 435.0 g of water as well as 0.15 g of Versenex 80. After addition of 140.0 g of 80% ADAME-Quat solution, the pH was adjusted to 5.0 with 0.1 g of 50% sulfuric acid, and the mixture was cooled to −0° C. and blown out with nitrogen. After addition of 0.40 g of ABAH (2,2'-azobis(2-methylpropionamidine) dihydrochloride), the polymerization was initiated with UV light. Within 25 minutes, the polymerization temperature rose from −5° C. to 80° C. The polymer was crushed with a meat grinder and dried at 100° C. for 90 minutes. The product was ground to a particle-size fraction of 90 to 1400 μm.

Polymers 17 to 20

These polymers were synthesized as for polymer 16, except that the starting weights were changed as indicated in the following table:

| Polymer | Starting weight of ADAME-Q | Starting weight of DIMAPA-Q | Starting weight of water |
|---|---|---|---|
| 17 | 0 g | 186.7 g | 383.0 g |
| 18 | 35.0 g | 140.0 g | 397.0 g |
| 19 | 70.0 g | 93.3 g | 411.7 g |
| 20 | 105.0 g | 46.7 g | 418.0 g |

All polymers have a cationic total charge of 35 mass per cent:

| Product | Adame-Quat* | DIMAPA-Quat* | Viscosity/mPas |
|---|---|---|---|
| Polymer 16 | 35 | 0 | 410 |
| Polymer 17 | 0 | 35 | 485 |
| Polymer 18 | 8.75 | 26.25 | 495 |
| Polymer 19 | 17.5 | 17.5 | 575 |
| Polymer 20 | 26.25 | 8.75 | 595 |

*Contents in mass percent

Polymers 18 to 20 are inventive polymers, while polymers 16 and 17 are comparison examples.

Practical Tests

Hydrolysis tests: Variation of the cationic activity as a function of time (pH: 9, RT)

| Polymer | Cationic activity after 1 h | Cationic activity after 1 day | Cationic activity after 3 days |
|---|---|---|---|
| 1 | 28.6 | <1 | <1 |
| 2 | 31.9 | 15.6 | 5.5 |
| 3 | 37.7 | 28.3 | 9.5 |
| 4 | 47.8 | 43.7 | 39.9 |

Measured with Mütek PCD

Dewatering of communal sewage sludge by the screen-test method

| Polymer | Dosage (kg per metric ton of dry substance) | Filtration time (s) | Turbidity ( ) | Standing time of the polymer solution (h) |
|---|---|---|---|---|
| 1 | 3.9 | 29 | 14 | 1 |
| 2 | 3.9 | 32 | 12 | 1 |
| 3 | 3.9 | 27 | 14 | 1 |
| 4 | 3.9 | 29 | 13 | 1 |
| 5 | 16.7 | 150 | 14 | 1 |
| 1 | 4.5 | 8 | 33 | 1 |
| 2 | 4.5 | 17 | 30 | 1 |
| 3 | 4.5 | 7 | 37 | 1 |
| 4 | 4.5 | 10 | 32 | 1 |
| 1 | 4.5 | 53 | 21 | 72 |
| 2 | 4.5 | 45 | 25 | 72 |
| 3 | 4.5 | 15 | 30 | 72 |
| 4 | 4.5 | 16 | 28 | 72 |

Ignition loss: 50.5%
Dry substance of the sludge: 31 kg/m$^3$
Electrical conductivity: 8.3 mS/cm$^3$ Fish toxicity of polymers (OECD 203) after 72 h at RT

| Polymer | Toxicity LC$_{50}$ (mg/l) |
|---|---|
| 1 | >100 |
| 2 | >100 |
| 3 | >100 |
| 4 | <10 |
| 5 | >100 * |

* no hydrolysis

Dewatering of communal sewage sludge by the screen-test method

| Polymer | Dosage (kg per metric ton of dry substance) | Filtration time (s) | Turbidity ( ) | Standing time of the polymer solution (h) |
|---|---|---|---|---|
| 10 [1] | 3.3 | 19 | 25 | 1 |
| 13 [1] | 3.3 | 18 | 21 | 1 |
| 14 [1] | 3.3 | 16 | 23 | 1 |
| 9 [1] | 3.3 | 17 | 18 | 1 |
| 5 [1] | 3.3 | 150 | 14 | 1 |
| 3 [1] | 3.3 | 24 | 15 | 1 |
| 12 [1] | 3.3 | 42 | 12 | 1 |
| 10 [2] | 3.1 | 25 | 22 | 1 |

-continued

| Polymer | Dosage (kg per metric ton of dry substance) | Filtration time (s) | Turbidity ( ) | Standing time of the polymer solution (h) |
|---|---|---|---|---|
| 15 [2)] | 3.1 | 17 | 23 | 1 |
| 13 [2)] | 3.1 | 16 | 22 | 1 |
| 8 [2)] | 3.1 to 6.2 | No flocculation | — | 1 |
| 7 [2)] | 6.2 | 26 | 12 | 1 |

[1)] Ignition loss: 57.3% Dry substance of the sludge: 30 kg/m$^3$ Electrical conductivity: 6.3 mS/cm$^3$
[2)] Ignition loss: 55.9% Dry substance of the sludge: 26 kg/m$^3$ Electrical conductivity: 6.4 mS/cm$^3$ Dewatering of a Suspension of Fibrous Material In these experiments the inventive polymers were tested as retention aids for paper manufacture. This test was carried out according to the acknowledged "dynamic drainage jar" method, in which the suspension of fibrous material is dewatered on a screen with constant stirring—without formation of a filter layer. The total retention and the retention of filler substance can be calculated by determining the solid content in the sample of fibrous material and in the filtrate. This study was carried out with a Mütek DFS 03.

In each example, 1 liter of a 1% suspension of fibrous material was dewatered. The mass of liberated water is listed in the table.

| | Dosage | | | |
|---|---|---|---|---|
| | 100 ppm | | 300 ppm | |
| | Time | | | |
| | 20 s | 30 s | 20 s | 30 s |
| Polymer 16 | 285 g | 345 g | 305 g | 365 g |
| Polymer 17 | 280 g | 340 g | 300 g | 365 g |
| Polymer 18 | 280 g | 340 g | 305 g | 370 g |
| Polymer 19 | 275 g | 320 g | 300 g | 370 g |
| Polymer 20 | 275 g | 320 g | 300 g | 370 g |

As is evident from the table, comparable results within the accuracy of the measurements were obtained in the dewatering tests of all products. However, the inventive polymers exhibit much lower toxicity than do the other products.

Dewatering on a Chamber Filter Press

In a clarifying plant, an inventive 80 wt % cationic terpolymer (20 wt % of acrylamide, 40 wt % of ADAME-Quat and 40 wt % of DIMAPA-Quat) having a viscosity of 300 mPas was tested against a combination of Zetag® 7848 FS 40 (trade name for an emulsion polymer of Ciba Spezialitätenchemie AG) and Zetag 7587 (80 wt % of ADAME-Quat and 20 wt % of acrylamide). For dewatering on a chamber filter press, 7 kg of the inventive terpolymer was needed per metric ton of solid, compared with 8 kg of polymer (emulsion calculated as polymer) in the case of the combination.

The proportions of dry substance achieved in the pressed sludge were equal.

The invention claimed is:

1. A polyelectrolyte comprising at least one cationic terpolymer prepared by polymerization of a monomer composition consisting of (i) (meth)acrylamide;
    (ii) trimethyl ammonium propyl acrylamide; and
    (iii) a quaternized dialkylamino alkyl(meth)acrylate selected from the group consisting of trimethyl ammonium methyl (meth)acrylate, triethyl ammonium methyl (meth)acrylate, trimethyl ammonium ethyl (meth)acrylate, triethyl ammonium ethyl (meth)acrylate, trimethyl ammoniumpropyl (meth)acrylate and triethyl ammonium propyl (meth)acrylate;
    the composition of the polyelectrolyte having a toxicity index $$Fi=(Q_{TP}-2Q_{ME})/10 \leq 1$$

where
$Q_{TP}$=total cationic charge of the polymer,
$Q_{ME}$=charge proportion of an ester-type monomer.

2. A polyelectrolyte according to claim 1, wherein the polyelectrolyte has a total charge of 1 to 99 mol %.

3. A polyelectrolyte according to claim 1, wherein the polymer has a solution viscosity of 10 to 2000 mPas.

4. A polyelectrolyte according to claim 1, wherein the quaternized dialkylamino alkyl(meth)acrylate is 3-dimethylammoniumpropyl(meth)acrylamide quaternized with methyl chloride (DIMAPA-Quat).

5. A polyelectrolyte according to claim 1, wherein the quaternized dialkylamino alkyl (meth)acrylate is 2-dimethylamino (meth)acrylate quaternized with methyl chloride (ADAME-Quat).

6. A polyelectrolyte according to claim 1, wherein the polymer is synthesized by a gel polymerization method.

7. A polyelectrolyte according to claim 1, wherein the polymer is synthesized by an emulsion polymerization method.

8. A polyelectrolyte according to claim 1, wherein the polymer is synthesized by a suspension polymerization method.

9. A method for dewatering sewage sludge comprising utilizing the polyelectrolyte claimed in claim 1.

10. A method for purification of waste water or conditioning of potable water comprising purifying waste water or conditioning potable water with the polyelectrolyte as claimed in claim 1.

11. A method for manufacture of paper or cardboard comprising manufacturing paper or cardboard with the polyelectrolyte as claimed in claim 1.

12. A water-in-water polymer dispersion, comprising a polyelectrolytes according to claim 1.

13. A polyelectrolyte according to claim 1, wherein the polyelectrolyte contains 0.1-20 wt. % of a highly cationic, low molecular weight polymer, based on the total composition of the polyelectrolyte.

* * * * *